J. R. Bridges,
Imp'd Nut Machine,
No. 67,403.    Patented Aug. 6, 1867.
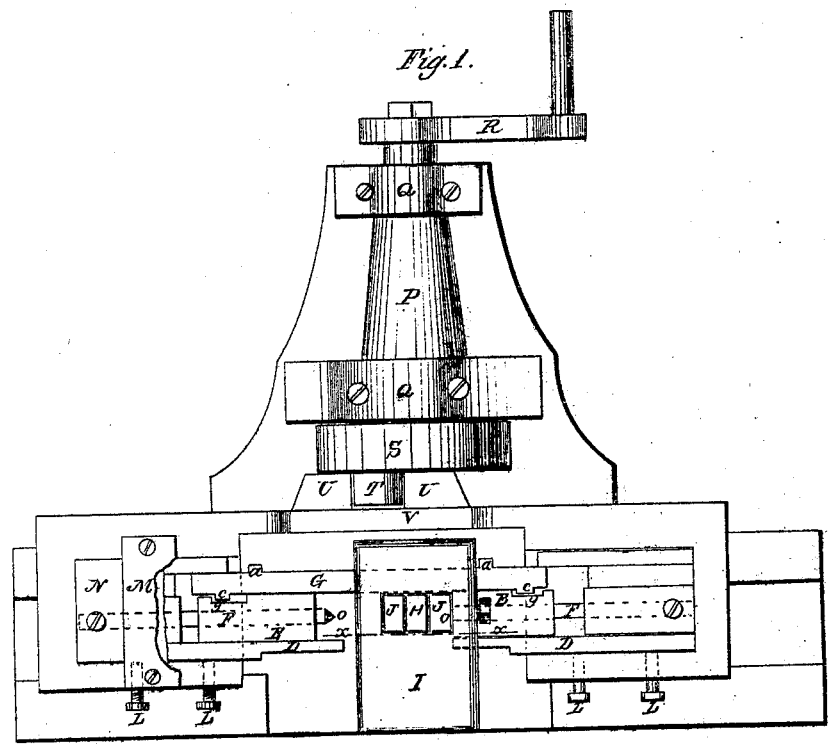
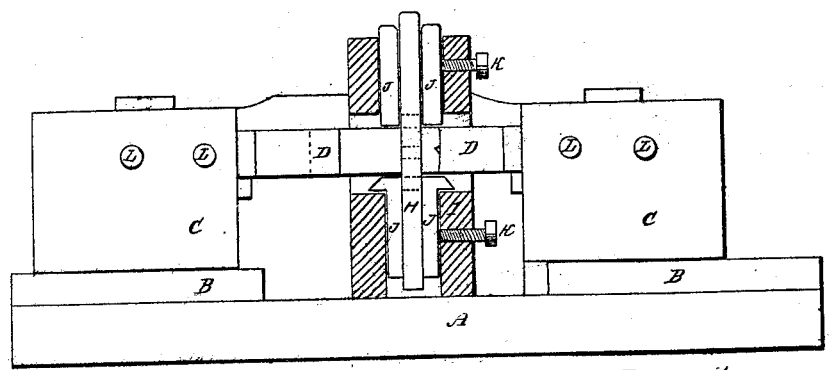
Witnesses.    Inventor.

Sheet 2-2 Sheets
J. R. Bridges,
Imp<sup>d</sup> Nut Machine,
No. 67,403. Patented Aug. 6, 1867.
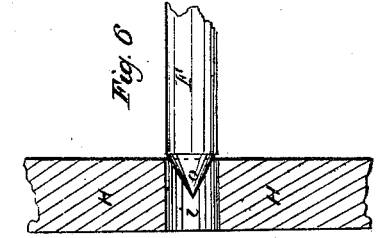
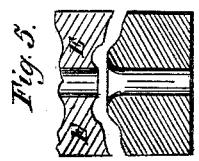
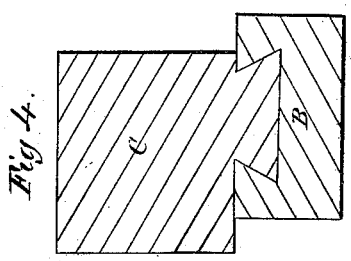
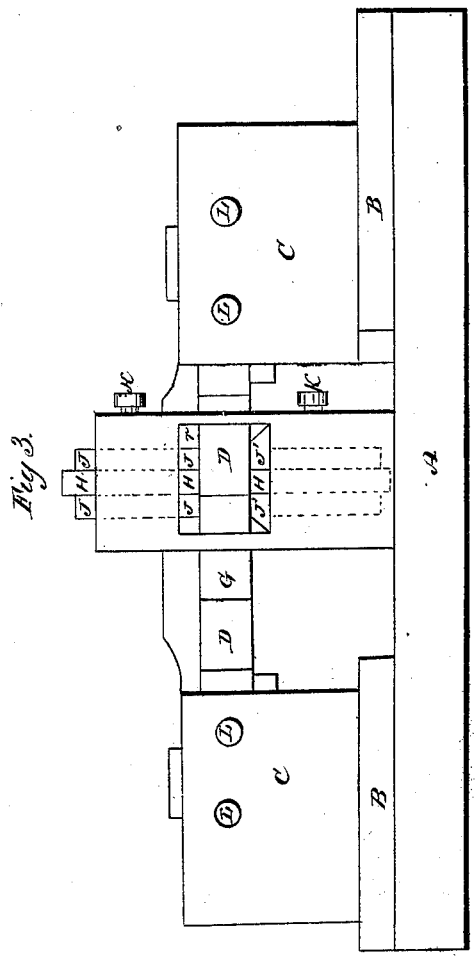
Witnesses.
W. D. Lewis
G. B. Cushing.
Inventor:
John R. Bridges,
by his Attorneys,
Bakewell & Christy

United States Patent Office.

JOHN R. BRIDGES, OF PITTSBURG, PENNSYLVANIA, ASSIGNOR TO HIMSELF AND G. O. FAUCETT, OF THE SAME PLACE.

Letters Patent No. 67,403, dated August 6, 1867.

IMPROVEMENT IN MACHINES FOR MAKING NUTS.

*The Schedule referred to in these Letters Patent and making part of the same.*

TO ALL WHOM IT MAY CONCERN:

Be it known that I, JOHN R. BRIDGES, of the city of Pittsburg, county of Allegheny, and State of Pennsylvania, have invented a new and useful Improvement in Nut Machines; and I do hereby declare that the following is a full, clear, and exact description thereof, reference being had to the accompanying drawings, forming part of this specification, in which—

Figure 1 is a plan or top view of my machine.
Figure 2 is a front elevation of the machine, the middle portion being a section through the line $x\ x$ of fig. 1.
Figure 3 is a front elevation of my machine.
Figure 4 is an end view of the base-plate and sliding blocks.
Figure 5 is a section of one of the square dies, and of a nut made in the machine, showing the shape of the semi-cylindrical washer formed around the eye of the nut.
Figure 6 is an enlarged view of the extremity of the eye-punch and part of the bottom plate.
Like letters of reference denote similar parts in the several figures.

In machines for making nuts from a blank severed from a bar of iron at a welding heat, the nut-blank is usually enclosed in a nut-box which surrounds it, and in which work two dies or punches, between which the nut is compressed, and which shape the top and bottom of the nut. These dies move in opposite directions, the lower one, when the nut is finished, moving forward, as the upper die recedes, to deliver the nut from the nut-box. In such machines the eye of the nut is made by means of a blunt-pointed round punch, which forces a wad out of the blank, or by a pair of round or taper-pointed punches which enter the nut-blank from opposite directions, and thus perforate it to form the eye, or the blank is first perforated slightly by a tapering punch, and afterwards the hole thus made is enlarged by a second punch. In ordinary machines it is necessary to turn the nut bar, after each nut is severed from it, in order to have the rag or fin on the same side of the nut, and in double machines, which have two sets of dies, and operate to make a nut on the backward stroke as well as on the forward stroke of the machine, it is necessary, in order to feed the bar, to move it by hand from one part of the machine to another.

In my machine the nut is compressed between a moving die and a bottom plate, which is stationary, while the blank is enclosed on two opposite sides by fixed blocks, and on the other two sides by the cutter which severed the blank from the nut bar, and by a stripping-piece, which, together with the cutter and eye-punch, recede after nut is made, carrying with them the finished nut, thus relieving it from confinement and overcoming the difficulty heretofore experienced in forming a nut by pressure in cavity—a matrix having a fixed and stationary bottom.

To enable others skilled in the art to construct and use my improved nut machine, I will proceed to describe its parts and their operation.

A is the bed-plate of the machine, in the centre of which is an upright block or standard, I, in which the operation of making the nuts is performed. This standard I has a rectangular cavity extending from top to bottom, in which are set the bottom plate H, against which the nuts are pressed, and the upper blocks J J, and lower blocks J' J', which form the two opposite sides of the matrix in which the nut is shaped. The bottom plate is placed between two upper blocks J J and two lower blocks J' J', so as to form the bottom of two matrices or nut cavities, one on each side of it. The bottom plate H and blocks J and J' are secured in place by set-screws K K in one side of the standard I. The widths of the bottom plate H and of the blocks J and J' are alike, being exactly equal to the width or diameter of the nut to be formed, and also to the distance from the lower face of the upper blocks J, and the upper face of the lower blocks J'. The bottom plate H' is perforated by a round hole, $i$, shown by dotted lines in fig. 2, the diameter of which is that of the eye of the nut, and into this hole $i$ the eye-punch F enters after it has perforated the nut-blank. The bottom plate H is perforated with a series of holes similar to $i$, so that, as the plate wears away or becomes rounded at the edge of the hole, it may be moved up or down, so as to bring a fresh portion of the plate and a new hole $i$ in position to form the bottom of the matrix. The lower blocks J' J' have ⊥-heads bevelled at the edge, to prevent their slipping down in the cavity of the standard I, and to serve as supports and guides for the square dies E E. The standard I has a square opening, s, passing horizontally through it for the passage of the square dies E E, and of the cutters D and stripping-piece G. It has also an opening, r, at one side, as shown in fig. 3, to allow of the nut bar being fed in.

At each end of the machine is a sliding block, C, one being placed on each side of the standard I, so as to range with it and with the other sliding block. Each of these sliding blocks carries a square die, E, a round eye-punch, F, and a cutter, D. The two sliding blocks are rigidly connected together by a plate, V, and move backwards and forwards with a reciprocating motion on the base-plate A between the dove tail slides B B, shown in fig. 4. The reciprocating movement of the sliding blocks C C is communicated by means of a roller or pin, T, working between the lugs U U, which project from the outside of the connecting plate V, and revolving with the wheel S, which receives its motion from the shaft P and crank R. The reciprocating movement of the sliding blocks C C may be obtained in any other manner which may be found more convenient. Each of these sliding blocks C C is recessed to receive a square die, E, cutter D, and round eye-punch F. (one such die, cutter, and punch being inserted in each block C.) The cutters and the head of the punches are firmly secured by the set-screws L L, while the square dies E E, although held in place, are free to slide within their respective blocks C on the round eye-punch F, which passes through the central bore in its square die. The extremity of the cylindrical eye-punch is conical, terminating in a point, as shown at o in fig. 1. The base of the cone forming the point of the eye-punch is somewhat smaller in diameter than the cylindrical part of the punch, so that around the base of the cone is a sharp, square edge, which serves to give the proper shape to the eye of the nut and make a clean and smooth bore. In passing through the nut-blank to form the eye of the nut the punch perforates the metal, displacing its particles without removing any iron therefrom, and thus, when the nut is enclosed in its matrix, secures the effect of compression by forcing the iron into the corners of the matrix or cavity. Thus my punch combines the advantages of the ordinary plane-ended or blunt punch, and of the tapering punch, while it obviates the objections of both kinds. The head of the eye-punch F, the cutter D, and square die E are held in place also by a plate, N, which covers the recess in the sliding block C, and is fastened down by a cross-piece, M. Although the square dies E E are held by their respective sliding blocks C C and move with them, when left to do so, yet they are, as before stated, not rigidly attached thereto, and are susceptible of motion or rest independent of the state of motion or rest of the sliding blocks. On this independent action of the square dies E E the operations of pressing the nut and delivering it from the eye-punch mainly depend, and it is produced by means of the stripping-piece G, which is a bar passing through the standard I, and reaching from one sliding block C to the other, entering the cavity of each block C alongside of the square dies E. This bar G forms one side of the cavity, in which the nuts are formed, on both sides of the standard I, and by its motion with the die E and cutter D, after the nut has been made, carries it away from between the blocks J J' in the standard I. On the back of the bar G are two pins or projections a, one on each side of the standard I, and which, when they come in contact with the side of the standard I, arrest the motion of the bar G, which otherwise moves with the sliding blocks C C. On the inner face of the bar G are two other pins c c, one near each extremity, which enters a recess, y, in each of the square dies E, (see fig. 1,) the effect of which is that when the motion of the bar G has been arrested by one of the pins a, as before stated, the pin c stops also the motion of the square die E, while the round eye-punch F and cutter D, still receding, leave the finished nut free to drop away from the machine.

My machine being constructed as described, operates to cut, press, and punch the nuts as follows: The nut bar being subjected to a welding heat is inserted into the machine through the opening r in the side of the standard I, so as to rest against one side of the bottom plate H with its extremity touching the bar G, which thus serves as a gauge, the die E, punch F, and cutter D being then in the position shown on the left-hand side of the standard I in fig. 3. The sliding block C, (on that side of the machine,) then advances towards the standard I, the cutter D severs the nut-blank from the bar of iron, and as it does so pushes the bar over, past the bottom plate H, just far enough to be fed in on the other side of the plate H, so as to form another nut on the next semi-revolution of the crank-shaft P. In cutting the blank from the bar of iron the cutter D forms the fourth side of the matrix or cavity in which the nut is to be formed, the other three sides being furnished by the bar G and the blocks J and J'. The eye-punch F then pierces the nut with its tapering point o, which passing entirely through the nut-blank, enters the round hole i in the bottom plate H, and thereby swells out the iron, forcing it into the angles of the matrix, giving sharp and well-defined corners to the nut. The square die E is then pressed forward by the head of the punch F and compresses the nut, which is thus finished. The head-block C then begins to recede on the return stroke of the machine, carrying with it the punch F, die E, cutter D, and bar G. The finished nut being on the eye-punch F, and held on two sides between the cutter D and bar G, is withdrawn by them from between the blocks J J'. The parts continue to recede in the same relative position until the pin a on the right-hand side of the machine comes in contact with the standard I, which arrests the motion of the bar G; the end of the recess y in the die E then comes in contact with the pin c on the bar G, which stops the backward movement of the die E, when the round punch F and cutter D, still drawing back away from the nut which rests on the face of the die E, leaves the finished nut unsupported, and it falls away from the machine. On the backward motion of the parts of the machine on one side of the standard I, as just described, the operative parts in the other side of the standard have been engaged in cutting, punching, and pressing a nut, so that not only is the time consumed in delivering the nuts saved, but the strain on the machine is rendered more uniform, and as the cutter D, in severing the nut-blank from the bar of iron, at the same time pushes the bar into the exact position required for feeding the bar into the machine, there is a great saving of labor, and a less degree of skill is required in tending the machine.

Another improvement in my machine consists in recessing the extremity or operative face of the square dies E E, around the central hole through which the eye-punch passes, with an annular semi-cylindrical or semi-oval groove, so as to form a raised bead around the eye of the nut in lieu of the flat-faced washer ordinarily formed on the top of the nut. The advantage of this is, that when the nuts are employed for wood-work, the bead being turned next to the wood, presses into it and takes a better hold.

Having thus described my improvement in nut machines, what I claim as my invention, and desire to secure by Letters Patent, is—

1. The annular semi-cylindrical or semi-oval recess on the face of the square die E for forming a raised bead around the eye of the nut, all as described and represented in fig. 5 of the drawings.

2. The bar G, provided with pins $a\ a$ and $c\ c$, in combination with the die E and standard I, for the purpose hereinbefore described.

3. The cutters D D, when so arranged in a double-operating nut machine as to pass the nut bar, from which the nut-blank has been severed, to the proper position for feeding into the other end of the machine, substantially as hereinbefore described.

4. The combination of the blocks J J', bottom plate H, cutter D, and bar G, for forming a matrix or nut-box to enclose the nut while it is being pressed and punched, and which shall open to release the nut on the withdrawal of the pressing die.

JOHN R. BRIDGES.

Witnesses:
    PETER WILSON,
    JOHN S. WILSON.